Oct. 24, 1972    R. H. MURASHIGE    3,700,480
VESICULAR FILM
Filed Jan. 6, 1971

INVENTOR.
ROBERT H. MURASHIGE
BY
*Limbach, Limbach & Sutton*
ATTORNEYS

United States Patent Office 3,700,480
Patented Oct. 24, 1972

3,700,480
VESICULAR FILM
Robert H. Murashige, Los Altos, Calif., assignor to
Memorex Corporation, Santa Clara, Calif.
Filed Jan. 6, 1971, Ser. No. 104,290
Int. Cl. G03c 1/52, 1/74
U.S. Cl. 117—34                2 Claims

ABSTRACT OF THE DISCLOSURE

A method of making vesicular film comprising drying a solution of a diazonium salt and polyvinyl formal onto a subcoated translucent substrate, and uniformly pre-exposing the uncoated base side of the substrate to a controlled light source to decompose diazonium compounds which have intruded into or near the subcoating whereby blistering of the subcoat is prevented.

SUMMARY OF THE INVENTION

Vesicular films may be made by coating onto a substrate polyvinyl formal containing photosensitive diazonium salts which decompose under exposure by actinic light to liberate nitrogen. Subsequent heating of the film permits the nitrogen to produce gas bubbles in the film in an image of the original exposure. The use of polyvinyl formal for making vesicular films is known, as shown for instance in British Patent No. 850,954.

A variety of substrates may be used for supporting the photosensitive layer of the vesicular film. Flexible films may be made using a variety of polymers such as polyethylene glycol terephthalate films available under the trademark Mylar, as is known in the art.

When a flexible polymer substrate such as Mylar is utilized, the surface is prepared with a subcoat preferably made of terpolymer of vinylidene chloride, acrylonitrile, and vinyl chloride to improve the binding of the diazonium salt solution to the substrate.

Under certain exposure and duplication conditions film made in this manner exhibits blisters formed by macroscopic bubbles between the base and the subcoating which distorts film information. Blistering is apparently caused by diazo compounds which have migrated into or have located near the subcoating layer.

A minor exposure of the film from the uncoated base side destroys what little diazo compound that has intruded into or near the subcoat layer. By proper regulation of the light exposure, the diazo compound is destroyed without materially decreasing either photographic speed or overall density of the reactive film coating.

DETAILED DESCRIPTION OF THE INVENTION

The preferred diazonium salt for use in this invention is 4-morpholino - 2,5 - diethoxybenzenediazonium chlorozincate having the general formula:

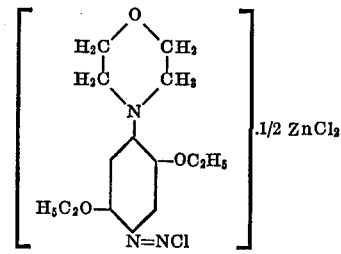

The polyvinyl formal and diazonium salt are preferably combined in a solution, and a stabilizer such as p-toluene sulfonic acid is preferably incorporated into the solution along with a wetting agent such as Na-di-(2-ethylhexyl)-sulfosuccinate sold under the trademark "Aerosol OT" which also tends to improve the sensitivity of the film.

The film components are combined together to form a solution for coating a substrate with a vesicular film. For a continuous flexible substrate, optical grade polyethylene glycol terephthalate available under the trademark Mylar is preferred.

To improve the adhesion of polyvinyl formal to the translucent Mylar substrate, a sublayer is employed between the Mylar and the polyvinyl formal. The sublayer comprises a coating of a terpolymer of vinylidene chloride, acrylonitrile, and vinyl chloride. Conventional coating equipment is employed to coat the substrate with the above mentioned terpolymer to a thickness of 30 microinches.

The polyvinyl formal solution containing the diazonium salt is then applied to the subcoated substrate and dried to a film thickness of $375\pm25$ microinches with conventional coating and drying equipment.

Figure 1:
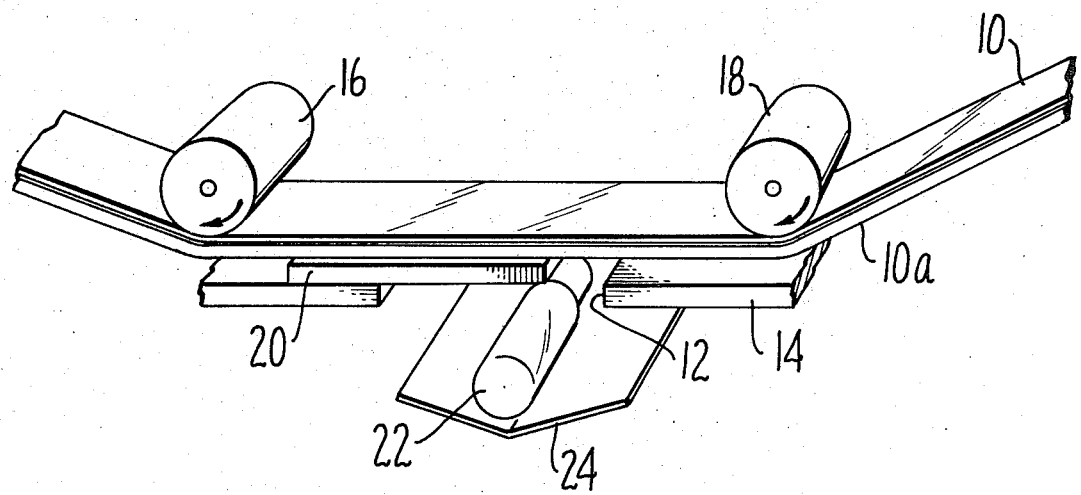
FIG. 1 is a schematic illustration of the exposure process.
Figure 2:
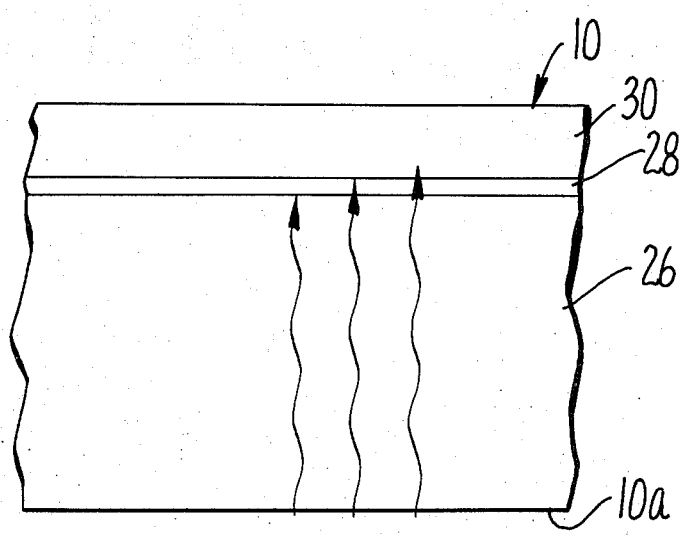
FIG. 2 is an enlarged view of a section of coated film.

The film is then subjected to a minor pre-exposure from the uncoated base side of the substrate as schematically illustrated in FIG. 1. The coated substrate 10 is continuously conveyed across an aperture 12 on an exposure shield 14 by two rollers 16 and 18, respectively. The size of the aperture 12 is controlled by a shutter plate 20 which can be reciprocally moved transversely across the aperture. The base side 10a of the substrate is conveyed across the aperture adjacent the shutter creating a brief but continuous exposure of a section of the moving substrate to ultra violet light. The light is generated by a 400 watt mercury arc lamp 22 and reflector 24 positioned opposite the aperture. When the substrate is conveyed across a 6-inch aperture at 47 feet per minute the light penetrates the translucent substrate, the subcoat 28 and the initial portion of the reactive film coating 30 adjacent the interface of the coating and subcoating as illustrated in FIG. 2.

As stated hereinbefore, this minor exposure of the film from the uncoated base side destroys what little diazo compound that has intruded into or near the subcoat layer without materially decreasing either photographic speed or overall density of the reactive film coating.

The partially exposed film may then be stored which enables the liberated nitrogen to escape from the film. The nitrogen release may be accelerated by heating the film to any degree up to the softening point of the film substrate.

I claim:
1. A method of making vesicular film comprising:
   (a) applying to a translucent substrate a primer material to improve adhesion of a polyvinyl formal solution;
   (b) coating the prepared substrate with a solution containing polyvinyl formal and a diazonium photosensitive material capable of liberating nitrogen under the influence of actinic light;
   (c) drying said coating;
   (d) subjecting the uncoated side of the substrate to a controlled pre-exposure to actinic light to selectively decompose the photosensitive material which has intruded into or near the subcoating.
2. The method of claim 1 in which said primer material is a terpolymer of vinylidene chloride, acrylonitrile, and vinyl chloride.

References Cited

UNITED STATES PATENTS

| | | | |
|---|---|---|---|
| 3,547,630 | 12/1970 | Notley | 96—27 R |
| 2,709,654 | 5/1955 | Guth | 96—49 |
| 3,157,560 | 11/1964 | Livingston | 117—93.31 |
| 2,699,392 | 1/1955 | Herrick | 96—91 R |
| 2,703,756 | 3/1955 | Herrick | 96—49 |
| 2,911,299 | 11/1959 | Baril et al. | 96—49 |
| 2,976,145 | 3/1961 | Baril et al. | 96—49 |
| 3,228,769 | 1/1966 | Workman | 117—34 |
| 3,383,213 | 5/1968 | Notley et al. | 96—49 |

FOREIGN PATENTS

| | | | |
|---|---|---|---|
| 850,954 | 10/1960 | Great Britain | 96—49 |

WILLIAM D. MARTIN, Primary Examiner

W. R. TRENOR, Assistant Examiner

U.S. Cl. X.R.

96—49, 75, 91; 117—93.31